July 21 1925.
J. B. KINCER
VEHICLE SPRING
Filed Feb. 7, 1920
1,546,903
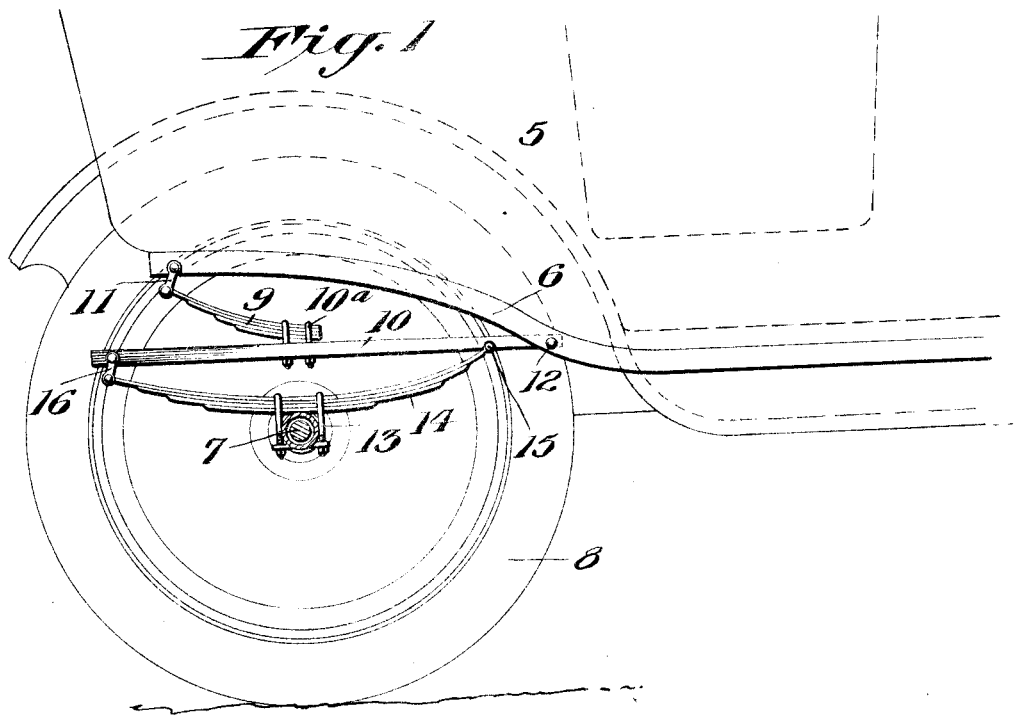
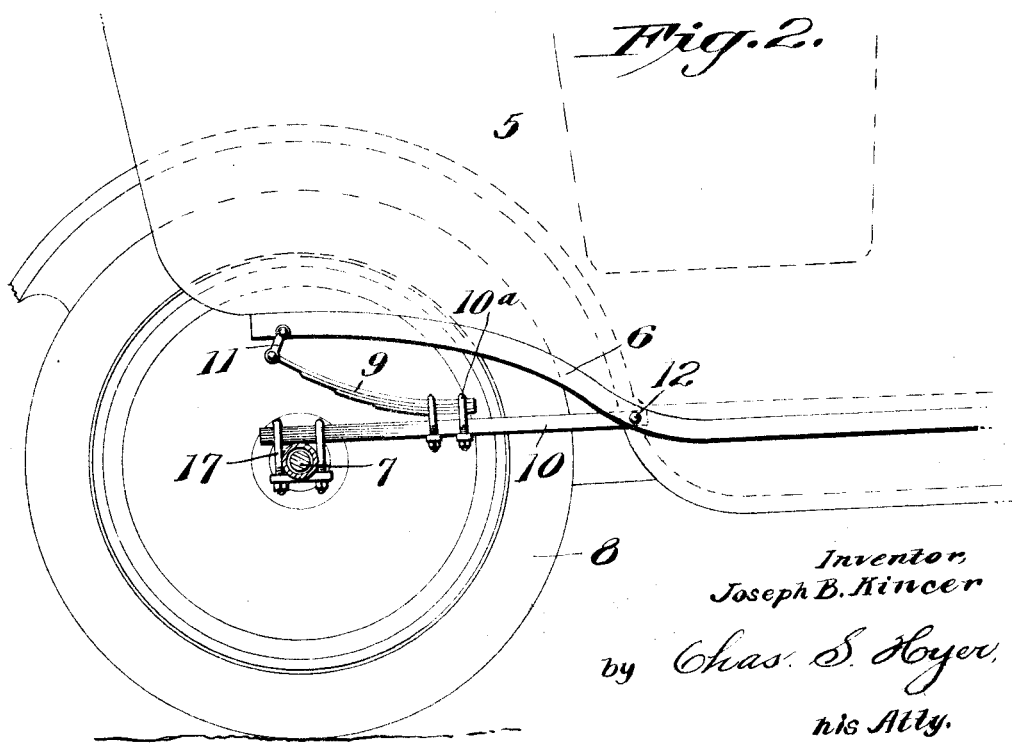
Inventor,
Joseph B. Kincer
by Chas. S. Hoyer,
his Atty.

Patented July 21, 1925.

1,546,903

UNITED STATES PATENT OFFICE.

JOSEPH B. KINCER, OF WASHINGTON, DISTRICT OF COLUMBIA.

VEHICLE SPRING.

Application filed February 7, 1920. Serial No. 357,006.

*To all whom it may concern:*

Be it known that I, JOSEPH B. KINCER, a citizen of the United States, residing at Washington, in the District of Columbia, have invented certain new and useful Improvements in Vehicle Springs, of which the following is a specification.

This inventiion relates to vehicle springs, and especially that type adapted for automobiles and like vehicles, and consists of an improvement upon and development of the springs disclosed by my Patent No. 1,341,805, dated June 1, 1920. The present improvement embodies a structure and general organization of elements operating in the same manner and having the same efficient resiliency as the springs disclosed by my aforesaid application.

One of the prime considerations of the public in the purchase of passenger automobiles for pleasure or otherwise is riding comfort. It is well known that as a general rule, the annoying vibrations, oscillations and joltings of automobiles when moving over uneven road surfaces vary inversely with the weight of the vehicle, or with its equivalent, the pressure exerted on the springs by the vehicle body. In the final analysis, it is clear that the riding qualities of a machine depends largely upon the pressure exerted on the springs by the vehicle body, as a heavy car, as well as a light one would ride roughly without springs. In view of this obvious condition, heavy cars are often purchased at a much greater expense relatively to lighter cars, in order that this riding comfort may be obtained.

The present improvement contemplates and provides a very simple and inexpensive spring organization by which the pressure exerted on a main bearing spring unit cooperating with the vehicle body may be mechanically increased to any desired extent without correspondingly increasing the weight of the vehicle body, thus giving a machine or vehicle the easy riding qualities, so much desired, without the expense involved in building a heavier machine. By the adoption of the improved spring organization, heavy machines, also, may be given those riding qualities that would be attained by a still heavier machine construction.

The preferred form of and the simple details in the spring organization embodying the features of the improvement and by which the results sought may be obtained, are illustrated in the accompanying drawing, wherein:—

Figure 1 is a side elevation of a portion of a vehicle in dotted lines showing the improved spring means applied thereto in full lines and an axle in cross section.

Figure 2 is a view similar to Figure 1 showing a modification of the structure.

The numeral 5 designates any vehicle body having a frame 6, an axle 7 and wheels 8. The form of vehicle illustrated is not essential to the successful operation or functioning of the improved spring organization, and various types of vehicle bodies, frames, and the usual or requisite accessories may be used. The improved organization is interposed between the vehicle body or its frame, which may be comprised in the body equipment in contradistinction to the running gear, and the axle, and consists essentially of a spring unit 9 of any preferred or adaptable form and a rigid intermediate support 10 of any suitable and requisite length and width and of any preferred construction. The spring unit 9 may be movably secured at one extremity to any part of the vehicle body, or, as shown, to the frame by link means 11, its opposite extremity being fixed to the intermediate support 10 as at 10ª. The intermediate support 10 is movably secured at its forward end 12 to the vehicle body or frame and has its opposite end free of attachment to the latter so as to be in condition to readily vibrate or oscillate, said support being also either indirectly or directly connected to the axle 7. In the construction shown by Fig. 1 the support 10 is indirectly connected to the axle 7 by a spring unit 14 intermediately attached to the said axle by a suitable clip 13, the unit 14 being movably secured at its forward end 15 directly to the support 10 and at its rear end is movably secured to the rear extremity of the said support by link means 16. In the form of the improvement shown by Fig. 2 the rear extremity of the support 10 is directly connected to the axle 7 by clip means 17, the spring unit 14 being omitted. The forward end of the spring unit 9 in either form of the improvement, may be attached to the support 10 at any point found best adapted to meet and practically operate with vehicle bodies and frame structures varying in weight. The spring unit 9 and support 10 are identical in both forms, similar reference characters being applied thereto and to corresponding detail connecting features in both figures.

The spring unit 9 is reversed relatively to ordinary spring units now in use, and such reversal is made possible by the interposition and attachment of the support 10 which vibrates or oscillates. The pressure on the spring unit 9 is increased in proportion as the distance of attachment of the forward end of said unit to the support 10, as at 10ª, is placed from the rear end of said support. This increased pressure, so far as spring resiliency and operation under normal stress are concerned, is equivalent to increasing by a like amount the actual weight of the vehicle body. For example, if, on a particular machine or vehicle, the point of attachment of the spring unit 9 to the intermediate support 10 be so placed as to increase the pressure on said unit by 25 per centum over that of the pressure on the spring unit now commonly used, then an 800 pound pressure or body weight on the spring unit now commonly used would result in the same operation as a 600 pound pressure would on the spring unit 9, as both spring units under these conditions would be subject to the same relatively controlled pressure. Thus a vehicle or machine exerting a 600 pound pressure or body weight on the spring unit 9 would run as smoothly as a vehicle or machine exerting an 800 pound pressure on its spring unit. By the present improved structure, the weight, so far as spring response is concerned, can be artifically increased to any desired proportion, depending upon the point on the intermediate support at which the spring unit 9 is attached, whether nearer the forward or rear end of the support. In other words a light machine on a spring structure or unit similar to the unit 9 can be made to ride as smoothly as a heavier machine over the ordinary spring structure now in use. It will therefore be understood that the spring unit 9 may have its forward end shifted over and fixed to the support 10 at different points as may be found desirable and necessary to meet the variation of weight stress of vehicle bodies imposed on the improved spring organization.

The organization shown by Fig. 1 has an additional advantage. The rear end of the lower spring unit 14 will communicate its vertical oscillations, caused by alternate compression and rebound, to the spring unit 9 to a much less pronounced extent than is the case in the commonly used spring structure. This result is due in a large measure to the movably mounted support 10 to which both spring units 9 and 14 are attached. As in my previous construction embodied in my patent hereinbefore mentioned, the function of the intermediate support between the spring units 9 and 14 as shown by Fig. 1, or between the one spring unit 9 and the axle as shown by Fig. 2, is the same, said function being to sustain the spring units or unit during rebound and sway neutralizing and suppression operations, this function being auxiliated by the movable attachment of the support and the movable connection of the spring units or unit thereto. This support also eases the movements of the spring units or unit in assuming abnormal positions and return to normal positions.

The present improvement in both forms shown and described, absorbs or neutralizes upward thrusts, rebounds or sways and minimizies resultant movements of the vehicle body in a practical and efficient manner. The appreciable effect of the upward movements of the axle on the vehicle body will be very small and consequently the running motion of the vehicle will be exceedingly smooth and quiet.

The spring units hereinbefore described are not limited to any particular structure and may be composed of any number of parts or members, the term "unit" being intended to comprise any spring means that may be employed to successfully perform the function and obtain the result sought. Furthermore, the intermediate support may be of any preferred structure and material, it only being necessary to provide a support means mounted to have a vibrating or oscillating movement, and to provide a leverage means for mechanically increasing the pressure on a spring unit.

What is claimed as new is:—

In a spring organization of the class specified, the combination with a vehicle body and running gear including an axle, of an oscillating rigid support movably attached at its front extremity to a portion of the vehicle body and extending rearwardly over the axle in a normal horizontal plane and connected to said axle, and a spring unit movably attached at its upper end to the rear portion of the vehicle body and inclined forwardly and downwary under the rear portion of said body and connected at its lower end to an intermediate portion of the said support, the lower end of said spring unit being applied and connected to the support at such distance between the ends of the said support as to compensate for variation in weight of the vehicle bodies with which it is used.

In testimony whereof I have hereunto set my hand in presence of two subscribing witnesses.

JOSEPH B. KINCER.

Witnesses:
KATHARINE DAVIS,
GENEVRA B. DIEHL.